United States Patent [19]
Ishida

[11] Patent Number: 5,367,550
[45] Date of Patent: Nov. 22, 1994

[54] BREAK ADDRESS DETECTING CIRCUIT

[75] Inventor: Ryuji Ishida, Tokyo, Japan

[73] Assignee: NEC Corporation, Tokyo, Japan

[21] Appl. No.: 138,772

[22] Filed: Oct. 19, 1993

[30] Foreign Application Priority Data

Oct. 30, 1992 [JP] Japan .................. 4-292838

[51] Int. Cl.$^5$ ............................ H03K 21/00
[52] U.S. Cl. ........................ 377/39; 371/19
[58] Field of Search ............. 377/39; 371/19

[56] References Cited

U.S. PATENT DOCUMENTS

| | | | |
|---|---|---|---|
| 5,134,701 | 7/1992 | Mueller et al. | 371/19 |
| 5,253,206 | 10/1993 | Tanaka et al. | 365/189.09 |
| 5,257,269 | 10/1993 | Hamauchi | 371/29.5 |
| 5,265,004 | 11/1993 | Schultz et al. | 364/140 |
| 5,274,831 | 12/1993 | Katsuta | 395/800 |
| 5,301,275 | 4/1994 | Vanbuskirk et al. | 395/250 |
| 5,311,461 | 5/1994 | Gallagher | 395/650 |
| 5,319,645 | 6/1994 | Bassi et al. | 371/19 |

*Primary Examiner*—Margaret Rose Wambach
*Attorney, Agent, or Firm*—Whitham, Curtis, Whitham & McGinn

[57] ABSTRACT

A break address detecting circuit sets a breakpoint in debugging a program for microprocessor, a signal processor, or the like. A first register holds a stop address ADstp. A first counter is initialized by a reset signal and counts up clock pulses in synchronism with a clock signal indicative of an instruction execution cycle. A selector selects a program address when the program is debugged, or selects output data from the first counter in step-by-step operation. A first comparator outputs a comparison result signal CR which is of an active level when output data from the selector and output data from the first register agree with each other. A second counter is initialized by the reset signal and counts up the comparison result signal each time the comparison result signal is of an active level. A second register holds a stop count CVstp. A second comparator outputs a break signal of an active level when output data from the second counter and output data from the second register agree with each other.

9 Claims, 3 Drawing Sheets

BREAK ADDRESS DETECTING CIRCUIT

BACKGROUND OF THE INVENTION

1. Field of the Invention

The present invention relates to a break address detecting circuit, and more particularly to a break addressing detecting circuit for setting a breakpoint in debugging a program for a microprocessor, a signal processor, or the like.

2. Description of the Prior Art

In the development of a program for a microprocessor, a signal processor, or the like, it is customary to temporarily halt, i.e., break, the execution of the program run by the processor at a certain program address and read the internal status of the processor, or execute the program one instruction at a time and follow the transition of the internal status of the processor each time an instruction is executed (step-by-step operation).

Heretofore, in order to break the execution of a program or execute a program step by step, an address where a program break is to occur is compared with actual addresses of the program which is run by a processor, and the operation of the processor is interrupted when the compared addresses agree with each other. FIG. 1 of the accompanying drawings shows a conventional break address detecting circuit for breaking the execution of a program.

As shown in FIG. 1, the conventional break address detecting circuit has a register 1 for holding and outputting a stop address ADstp where the operation of a processor is to be halted, and a comparator 2 for outputting a break signal BRK when an address ADpro of a program that is run by the processor (hereinafter referred to as a "program address ADpro") is compared and agrees with the output signal from the register 1, i.e., the stop address ADstp.

To debug a program using the conventional break address detecting circuit, an address where a program break is to occur is transferred to the register 1. Then, the processor is reset to start the program. The processor successively executes instructions in the sequence according to the program. At this time, program addresses that are successively executed by the processor are addresses in a program memory from which the program is read. The program addresses ADpro are successively inputted to the comparator 2. The comparator 2 compares the stop address ADstp held in the register with the program addresses ADpro. When the stop address ADstp agrees with one of the program addresses ADpro, the comparator 2 outputs a break signal BRK of an active level, breaking the operation of the processor.

The step-by-step operation is essentially the same as the above breaking operation. According to the step-by-step operation, an address of the program which is to be executed next to the address where the program is halted is stored in the register 1, and the processor is reset from the broken condition to execute the program from the start. Alternatively, the break is canceled and an instruction line next to the break is executed, whereupon the execution of the program is interrupted again. To repeat the step-by-step operation, the above process is repeated a desired number of times.

However, the conventional break address detecting circuit suffers the following drawbacks:

Since a breakpoint is indicated by a program address, if a program contains a branch instruction to cause execution to jump to a later address or a loop instruction to repeat the same instruction a plurality of times, then when a break is to occur at an instruction line that is to be executed a plurality of times, the program is halted when the instruction is executed for the first time, and it is impossible to break the program after the loop instruction is executed a desired number of times.

In decoding instructions according to the step-by-step operation, if the instructions contain a branch instruction, then it is necessary to know in advance whether execution is branched from the branch instruction. Therefore, a controller for controlling the debugging process needs a processor simulator.

If a break of a program is to occur after elapse of a certain period of time from the execution of an instruction, i.e., after the instruction at a certain step is executed, then in the event that the program contains a branch instruction, an execution address at the time the step is executed can only be determined by carrying out the step-by-step operation successively and counting the steps. Such a process is complex and the execution time is very long.

SUMMARY OF THE INVENTION

It is therefore an object of the present invention to provide a break address detecting circuit which is capable of causing a program to break when a certain instruction is executed a desired number of times even if the program contains a jump instruction or loop instruction.

Another object of the present invention is to provide a break address detecting circuit which makes it unnecessary for a debugging controller to know the next program address to be executed in decoding instruction according to the step-by-step operation.

Still another object of the present invention is to provide a break address detecting circuit which allows simplification of the arrangement of a debugging controller and which has a very high processing speed when a break is to occur a certain period of time after an instruction is executed.

According to one aspect of the present invention, there is provided a break address detecting circuit comprising first data holding means for holding and outputting first data of a predetermined value, first counter means initializable by a reset signal for counting clock pulses in synchronism with a clock signal and for outputting counted data, selector means for selecting and outputting one program address and output data from the first counter means in response to a selection signal, first comparator means for comparing output data from the selector means and output data from the first data holding means and for outputting a comparison result signal which is of an active level when the compared data agree with each other, second counter means initializable by the reset signal for counting the comparison result signal each time the comparison result signal is of an active level and for outputting counted data, second data holding means for holding and outputting second data of a predetermined value, and second comparator means for comparing output data from the second data holding means and output data from the second counter means, and outputting a break signal which is of an active level when the compared data agree with each other.

According to another aspect of the present invention, there is provided a break address detecting circuit comprising first data holding means for holding and outputting first data of a predetermined value, first comparator means for comparing output data from the first data holding means and a program address and for outputting a comparison result signal which is of an active level when the compared data and program address agree with each other, selector means for selecting in response to a selection signal either the comparison result signal or a clock signal which repeatedly alternates between active and inactive levels with predetermined timing, counter means initializable by a reset signal for counting output data from the selector means each time the output from the selector means is of an active level and for outputting counted data, second data holding means for holding and outputting second data of a predetermined value, and second comparator means for comparing output data from the second data holding means and output data from the counter means and outputting a break signal which is of an active level when the compared data agree each other.

The above objects and features, as well as other advantages, of the present invention will be more apparent from the following description of the preferred embodiments in conjunction with the accompanying drawings.

DETAILED DESCRIPTION OF THE PREFERRED EMBODIMENTS

Figure 1:
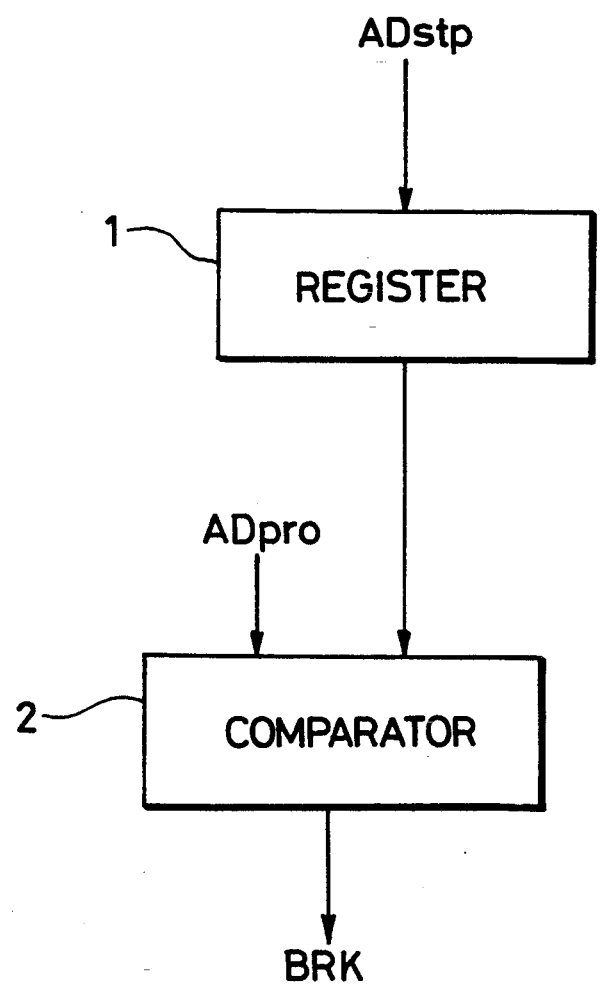
FIG. 1 is a block diagram of a conventional break address detecting circuit.
Figure 2:
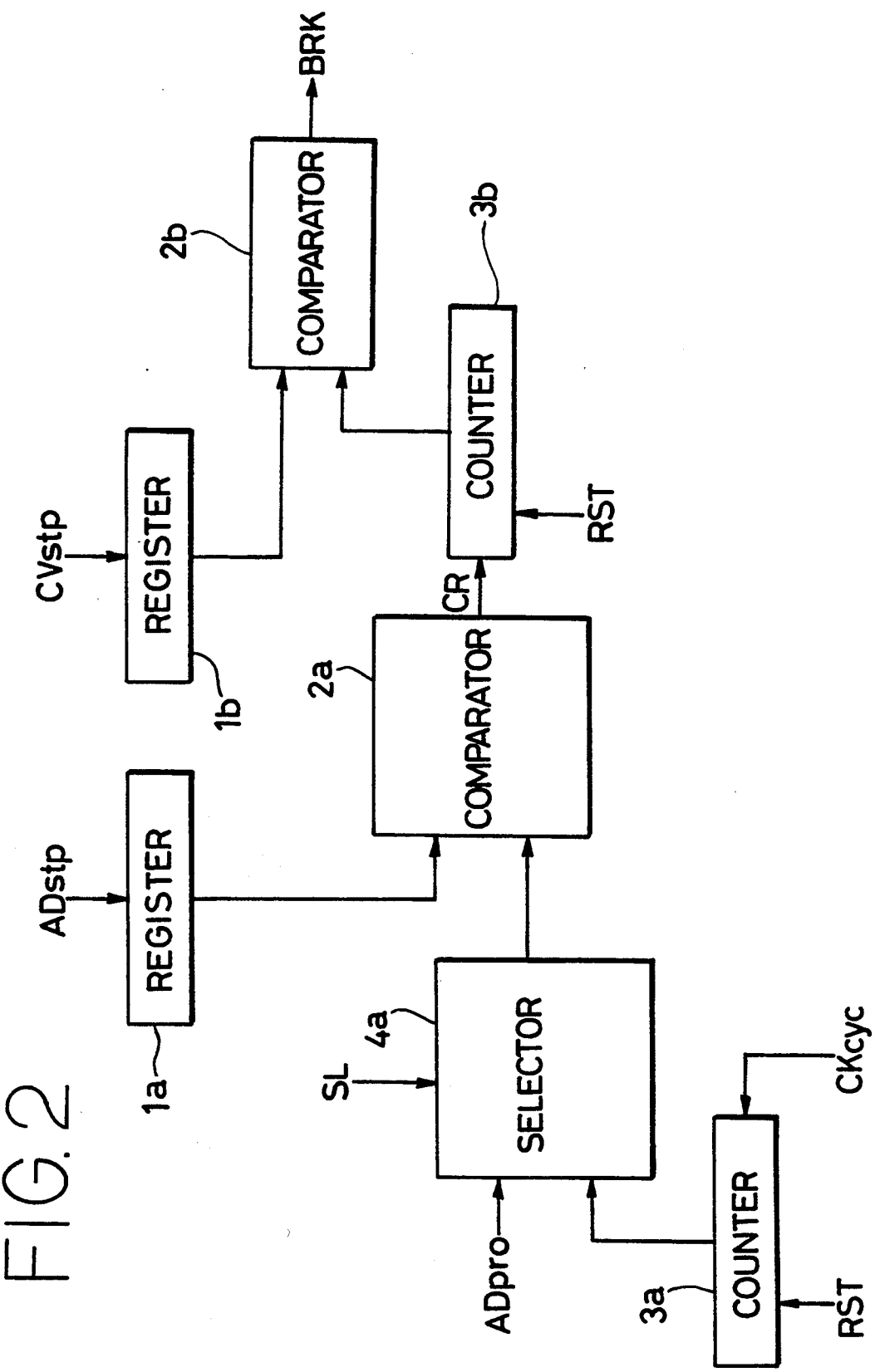
FIG. 2 is a block diagram of a break address detecting circuit according to a first embodiment of the present invention.

As shown in FIG. 2, a break address detecting circuit according to a first embodiment of the present invention has a register 1a for holding and outputting first data ADstp (hereinafter referred to as a "stop address ADstp") of a predetermined value; a first counter 3a which is initialized by a reset signal RST and counts up clock pulses in synchronism with a clock signal CKcyc (hereinafter referred to as an "instruction cycle clock signal CKcyc") indicating an instruction execution cycle, and outputs counted data; a selector 4a for selecting and outputting one program address ADpro being executed and the output data from the first counter 3a in response to a selection signal SL; and a first comparator 2a which compares the output data from the selector 4a and the output data from the register 1a and outputs a comparison result signal CR which is of an active level when the compared data agree with each other. The break address detecting circuit also includes a second counter 3b which is initialized by the reset signal RST, counts up the comparison result signal CR each time the comparison result signal CR is of an active level, and outputs counted data; a register 1b for holding and outputting second data CVstp (hereinafter referred to as a "stop count CVstp") of a predetermined value; and a second comparator 2b which compares the output data from the register 1b and the output data from the second counter 3b and outputs a break signal BRK which is of an active level when the compared data agree with each other.

Operation of the break address detecting circuit shown in FIG. 2 will be described below.

To debug a program run by a processor using the break address detecting circuit shown in FIG. 2, an address where a program break is to occur, i.e., a stop address ADstp, is stored in the register 1a. For a simple program break, a stop count CVstp of "1" is stored in the register 1b. The selector 4a is controlled to select a program address ADpro by the selection signal SL.

The program can now start to be executed by resetting the processor, i.e., making active the reset signal RST. When the reset signal RST is applied to the first and second counters 3a, 3b, any data stored in these counters 3a, 3b is initialized to "0." As the program is executed, the program address ADpro is updated. When the program address ADpro agrees with the stop address ADstp stored in the register 1a, the output signal, i.e., the comparison result signal CR, of the first comparator 2a is of an active level. The second counter 3b counts its data and holds and outputs a value of "1." Since this value is the same as the value held in the register 1b, the second comparator 2b outputs a break signal BRK of an active level, causing the processor to break the execution of the program.

If a program break is to occur after a certain instruction, such as a loop instruction or the like, is executed a plurality of times, the number of times that the certain instruction is to be executed, e.g., "3," is stored as the stop count CVstp in the register 1b. The processor is then reset to start the program and the second counter 3b is initialized. Each time the program address ADpro agrees with the value stored in the register 1a, the comparison result signal CR outputted by the first comparator 2a goes active in level, and the second counter 3b counts its data. When the program address ADpro agrees with the value stored in the register 1a three times, the second counter 3b produces output data "3" that agrees with the value stored in the register 1b. Therefore, the second comparator 2b outputs a break signal BRK of an active level, causing the processor to break the execution of the program.

To break the execution of the program by way of step-by-step operation, the selection signal SL is applied to enable the selector 4a to select the output data from the first counter 3a. In the step-by-step operation, the data stored in the register 1a is not an address where a program break is to occur, but the number of instruction cycles that are to be executed after the program is started. The register 1b stores a value of "1." At the same time that the processor is reset, the first and second counters 3a, 3b are initialized, and execution of the program begins. The first counter 3a counts the instruction cycle clock signal CKcyc. When the count of the first counter 3a agrees with the value stored in the register 1a, the comparison result signal CR outputted from the first comparator 2a goes active in level, and the second comparator 2b outputs a break signal BRK of an active level, causing the processor to break the execution of the program.

If only one execution instruction line is to be executed, the data stored in the register 1a is reset by adding "1" to the data that has been stored in the register 1a, following which either the processor is reset or the break is canceled. If the processor is reset, instruction cycles are executed from the start. If the break is canceled, the value stored in the first counter 3a agrees with the data stored in the register 1a when one instruction cycle is executed. The operation of the processor is interrupted and only one execution instruction line is executed. The above process has nothing to do with where the program address ADpro is located.

If a break is to occur a certain period of time after instructions are started, the first counter 3a is set to this number of steps, because a program execution time can be calculated simply by multiplying an instruction execution cycle time by the number of steps. If a break is to occur again a certain period of time after a previous break, the first counter 3a is reset to a value which is the sum of the value that is in the first counter 3a and the number of steps.

The number of bits of the second counter 3b which counts loops is small relatively to the first counter 3a which counts instruction steps. The counters 3a, 3b may be combined with each other with the counter 3b regarded as high-order bits of the counter 3a, and data may be set in advance in the register 1b, making it possible to count instruction execution cycles that are equal to cycles of the sum of bits of the counters 3a, 3b.

Figure 3:
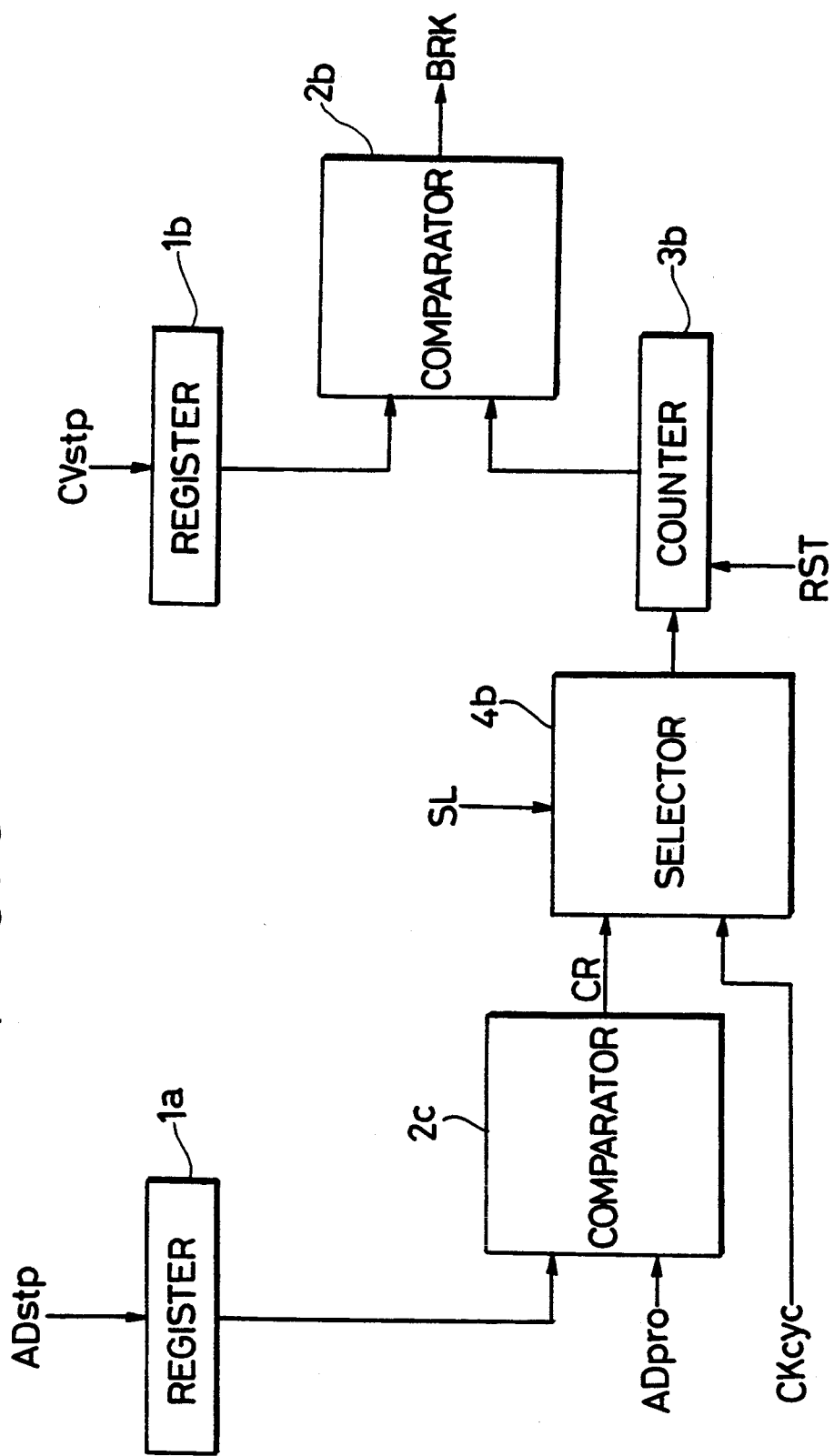
FIG. 3 is a block diagram of a break address detecting circuit according to a second embodiment of the present invention.

FIG. 3 shows a break address detecting circuit according to a second embodiment of the present invention.

As shown in FIG. 3, the break address detecting circuit has a register 1a for holding and outputting first data ADstp (stop address ADstp) of a predetermined value; a first comparator 2c which compares the output data from the register 1a and a program address ADpro and outputs a comparison result signal CR which is of an active level when the compared data agree with each other, a selector 4b for selecting and outputting in response to a selection signal SL either the comparison result signal CR or an instruction cycle clock signal CKcyc which repeatedly alternates between active and inactive levels with predetermined timing; a counter 3b which is initialized by a reset signal RST and which counts up the output data from the selector 4b each time the output data from the selector 4b is of an active level and outputs counted data; a register 1b for holding and outputting second data (stop count CVstp) of a predetermined value; and a second comparator 2b which compares the output data from the register 1b and the output data from the counter 3b and outputs a break signal BRK which is of an active level when the compared data agree with each other.

The break address detecting circuit shown in FIG. 3 operates as follows:

As with the first embodiment, to break the execution of a program run by a processor during a program debugging process, an address where a program break is to occur, i.e., a stop address ADstp, is stored in the register 1a. A stop count CVstp of "1" is stored in the register 1b. The selector 4b is controlled to select the comparison result signal CR outputted from the first comparator 2c. The processor is then reset, initializing the counter 3b and starting the program. When the program address ADpro agrees with the stop address ADstp stored in the register 1a, the comparison result signal CR from the first comparator 2c goes active in level. The counter 3b counts its data and holds and outputs a value of "1." The second comparator 2b then outputs a break signal BRK of an active level causing the processor to break the execution of the program.

If a program break is to occur after a certain instruction, such as a loop instruction or the like, is executed a plurality of times, the stop count CVstp is set to a desired number, as with the first embodiment.

To break the execution of the program by way of step-by-step operation, the selection signal SL is applied to enable the selector 4b to select the instruction cycle clock signal CKcyc. In this embodiment, the number of steps is set in the register 1b. The processor is now reset, initializing the counter 3b and starting the program. The counter 3b counts the instruction cycle clock signal CKcyc. When the count of the counter 3b agrees with the data stored in the register 1b, the second comparator 2b outputs a break signal BRK of an active level, causing the processor to break the execution of the program.

As with the first embodiment, a program break after elapse of a desired period of time can be achieved by the break address detecting circuit shown in FIG. 3.

The bit lengths of the register 1b, the second comparator 2b, and the counter 3b according to the second embodiment are larger than the bit lengths of the register 1b, the second comparator 2b, and the second counter 3b according to the first embodiment. This is because in the first embodiment, it is possible to reduce the bit lengths to a certain extent because they count only loops, and the counters 3a, 3b may be regarded as counters of high- and low-order bits in a counter of a large bit length in step-by-step operation, but the same large bit length has to be assigned to the counter 3b in the second embodiment. However, inasmuch as only one counter is employed, the circuit arrangement of the second embodiment is simpler than that of the first embodiment.

While the invention has been shown and described in detail with reference to preferred embodiments thereof, it will be understood by those skilled in the art that changes in form and details can be made therein without departing from the spirit and scope of the invention.

What is claimed is:

1. A break address detecting circuit comprising:
   first data holding means for holding and outputting first data of a predetermined value;
   first counter means initializable by a reset signal for counting up clock pulses in synchronism with a clock signal and outputting counted data;
   selector means for selecting and outputting in response to a selection signal either a program address or output data from said first counter means;
   first comparator means for comparing output data from said selector means and output data from said first data holding means and outputting a comparison result signal which is of an active level when the compared data agree with each other;
   second counter means initializable by said reset signal for counting up the comparison result signal each time the comparison result signal is of an active level and outputting counted data;
   second data holding means for holding and outputting second data of a predetermined value; and
   second comparator means for comparing output data from said second data holding means and output data from said second counter means and outputting a break signal which is of an active level when the compared data agree with each other.

2. A break address detecting circuit comprising:
   first data holding means for holding and outputting first data of a predetermined value;
   first comparator means for comparing output data from said first data holding means and a program address and outputting a comparison result signal which is of an active level when the compared data and program address agree with each other;
   selector means for selecting in response to a selection signal either said comparison result signal or a clock signal which repeatedly alternates between active and inactive levels with predetermined timing;

counter means initializable by a reset signal for counting output data from said selector means each time the output data from said selector means is of an active level and outputting counted data;

second data holding means for holding and outputting second data of a predetermined value; and second comparator means for comparing output data from said second data holding means and output data from said counter means and outputting a break signal which is of an active level when the compared data agree with each other.

3. A break address detecting circuit according to claim 1, wherein said first data holding means comprises means for holding as said first data an address where a break is to occur, and said selector means comprises means for selecting a program address.

4. A break address detecting circuit according to claim 2, wherein said first data holding means for holding as said first data an address where a break is to occur, and said selector means comprises means for selecting said comparison result signal.

5. A break address detecting circuit according to claim 1, wherein said first data holding means comprises means for holding as said first data the number of instruction cycles executed after a program is started, and said selector means comprises means for selecting the counted data outputted from said first counter means.

6. A break address detecting circuit according to claim 2, wherein said second data holding means comprises means for holding the number of steps as said second data, and said selector means comprises means for selecting said clock signal.

7. A break address detecting circuit according to claim 1, further comprising means for resetting the data stored in said second data holding means by adding "1" to the data which has been stored in said second data holding means.

8. A break address detecting circuit according to claim 1, further comprising means for setting said first counter means to the number of steps.

9. A break address detecting circuit according to claim 2, further comprising means for resetting the data stored in said second data holding means by adding "1" to the data which has been stored in said second data holding means.

* * * * *